UNITED STATES PATENT OFFICE.

RICHARD LAMB, OF NEW YORK, N. Y., ASSIGNOR TO HIMSELF AND JOSEPH LAMB, OF SAME PLACE.

IMPROVEMENT IN THE MANUFACTURE OF ARTIFICIAL MARBLE.

Specification forming part of Letters Patent No. 27,022, dated January 31, 1860.

*To all whom it may concern:*

Be it known that I, RICHARD LAMB, of the city, county, and State of New York, have invented certain new and useful Improvements in the Manufacture of Artificial Marble, whereby I am enabled to produce a more cohesive stone with a closer imitation of nature and with less labor and skill than by any process hitherto known; and I do hereby declare the following to be a full, clear, and exact description of the same, reference being had to the specimens forwarded herewith, of which the following short paragraphs will suffice to designate the several points of difference between the several specimens.

The small green slab is made of two kinds of balls, (white and black,) and the green is applied dry in two shades. The white specimen is made entirely from white balls. The shades of purple are applied dry. The two lightest shades are allowed to adhere to the balls before they are thrown together, and the darkest is sprinkled in among them in excess. The red specimen is composed of two kinds of balls, light purple and light flesh-colored. The veining is Indian red, (red oxide of iron.) It is applied both to the surfaces of the balls and in excess.

The specimens of materials are as follows: Bottle A contains calcined gypsum or a mixture of dry powder of a like character uncolored. Bottle B contains balls of a similar cement mixed up in water to the consistency of paste and partially coated with dry paint (Turkey red) by allowing the latter to adhere to the former while in a pasty condition. Bottle C contains similar balls coated with a different dry paint (Indian red) applied in the same manner. Bottle D contains a powder composed of two parts calcined gypsum and one part dry paint, intimately mixed and ready to be strewn among the balls in the act of manufacturing the artificial marble. Bottle E contains one part dry cement in powder (either gypsum or similar material) and one part dry paint, (Indian red.)

I make my artificial marble by mixing water with suitable cements and mineral colors and allowing the mass to harden. Any cement may be used for this purpose which will "set" or harden after being mixed with water. Among the varieties which I prefer are calcined sulphate of lime, (gypsum or plaster,) Martin's cement, Keene's marble cement, Scott's plaster and an English material known as "Parian" cement.

This general method of manufacture has long been practiced, and my invention lies in the means by which I distribute and arrange the materials to produce the effect of natural marble and in the means by which I avoid any confusion or blending of the colors.

I mingle with water a portion only of the above-described cement, and when this is of the consistency of a thick paste of homogeneous character I agitate with it an additional quantity of pulverized cement in a dry state, the effect of which is to separate the pasty mass into balls of various sizes, each covered with a coating of dry material. In this condition the balls may be picked up and handled, either separately or in a mass, without adhering, so long as the pressure applied thereto is very slight; but on placing such balls in a mould or on a suitable table and compressing them the moisture within each ball penetrates the dry material and incorporates the whole mass of balls into a slab of marble. Any suitable coloring-matter previously applied to the surface of the balls will then appear in irregular streaks on the surface of the marble, and the marble may be stoned or polished without destroying the effect.

The graining or veining thus produced is natural, and may be made to imitate every variety of marble by giving a suitable size or variety of sizes to the balls in each instance and by applying suitable colors. These varieties are nearly all produced without the exercise of skill, but only by throwing the balls and color carelessly upon the surface on which the marble is to be made. The softness of the freshly mixed cement in my balls allows them to readily join, under pressure, with the lines of veins between them forming every variety of curves and angles, and the particles being all in their places in the mass of marble before the material commences to set the process of setting proceeds without any disturbance, and consequently produces a stronger or more cohesive marble than has heretofore been artificially made.

In the manufacture of artificial marble heretofore the cement was mixed into a paste and allowed to partially set or harden without manipulation. After this it was broken into masses of varying sizes, which masses were colored and subsequently united by compressing them together. My process differs from this both in the mode of operating and in the article produced. Thus in former cases cement was mixed in a mass, laid away, and allowed to become partially set, and was afterward broken by hand, while in my improved process the cement is well mixed in a mass, immediately shaken up with dry cement, colored, and then immediately tumbled together and compressed. Other artificial marble is weakened by the compressive action being applied after the material has partly set, while mine preserves all the cohesive strength due to a complete setting or hardening of the material without disturbance. The hard pasty masses in the former case are angular, and thus seem to possess an advantage over mine, which are spherical; but the softness of my balls allows them to assume as great a variety of angles and in a manner more nearly like the processes of nature. The hardness of the masses in the old processes was perhaps necessitated by the method of coloring by wet paint then employed; but I succeed with my fresh pasty balls by adopting a different mode of coloring, which will be described below. Balls analogous in character to mine have heretofore been incidentally produced in the mixing of bread and in many other branches of the arts; but they have never heretofore been used in the manner in which I use them.

The next feature of my invention lies in the application of the color to the surface of these balls. The practice has heretofore been to mix the coloring-matter with water and distribute it evenly or unevenly upon the fragments. This water, by wetting the material on the surface, induced a disagreeable condition of the mass, and the presence of so large quantities of moisture in and about the surfaces of the fragments induced a flowing together or "smudging" of the colors, which very greatly impaired the effect. In other words, the coloring-matter so applied blended partially with the cement in its vicinity, and if two or more colors or shades were introduced they united at many points, and the result was not a good imitation of delicately-veined and high-priced marbles. In order to avoid, or partially avoid, this evil the fragments were sometimes allowed to remain until the surfaces have become partially dried before compressing them together; but this only partially avoided the difficulty, and artificial marble has heretofore been open to both the objections here named: First, it has been weak; and, second, the colors have been dirty or more or less run together, and also flowed into the mass of the cement.

My method of applying the colors involves neither of these evils and produces a very clearly-grained marble. It also allows the employment of several shades or of several colors without involving any difficulty by reason of the blending of the same. My improved mode of coloring lies in applying the coloring-matter in the form of a dry powder to the surface of the balls. It may be strewn at random, sifted, or applied in any other convenient manner, and allowed to adhere in a thin dry coating. This is all that could be desired in the production of thin veins; but for the making of occasional thick veins I have a still further modification, which consists in mixing the coloring-matter with a suitable proportion of cement, to insure a uniform cohesion of the mass and suitably distributing it in a dry state among the balls in somewhat larger quantities than can by any means be made to adhere to the surfaces. The colored cement thus applied absorbs moisture but gradually from the moist balls, and is never so much wetted as to induce any diffusion of the color into the adjacent matter. Care must be taken when throwing in the larger quantities of colored cement to allow no accumulation of such size as will not be sufficiently moistened when the mass is compressed. The several shades or colors are easily distinguished when the marble is polished, and any of the fancy colored marbles may be perfectly imitated.

For the production of imitations of all ordinary marbles, a much lower degree of skill will suffice by my process than by any previously known. This is due to the fact that the balls may be handled with much less care, and none of the precautions required in the old process to diminish the smudging of the colors and to avoid a too great drying of the balls are necessary. I find in practice that a very much smaller quantity of coloring-matter is required with my process than with the other. The colors are equally bright, and the cohesive strength of the product is as great as in artificial marble produced by any other means, if not greater. Less polishing or stoning is required to finish the surface of my marble.

The proportions in which I find it proper to mingle the cement with the coloring-matter before applying it varies with the character and quality of both. In some instances I mix the ingredients in the proportion of more than one-half pure mineral color; but as a general rule it may be safe to say two pounds of cement to one of paint. To produce paler shades the color may be mixed in smaller proportions indefinitely.

My object in mixing the cement with color is to insure a cohesion of the colored masses in the marble equal, or about equal, to that of the other portions.

The extreme proportions of any cement used with dry color may be ascertained by moistening a small quantity and testing its strength after allowing it to harden.

My process is susceptible, like the others enumerated, of either allowing the whole body of the material to be grained throughout or of simply forming a surface so grained of any desired thickness. In the former case the whole mass must be made of balls with the above-described small quantities of colored cement distributed irregularly between them, while in the latter case a small quantity of balls are distributed over a surface and moistened cement in mass is applied above and pressed down thereon.

Having thus fully described my invention, what I claim as new in the manufacture of artificial marble, and desire to secure by Letters Patent, is—

1. The within-described method of arranging the veining in artificial marble—that is to say, the separation of freshly-mixed cement into balls of irregular sizes by agitating with dry cement, the application of one or more colors to the surfaces thereof and compressing the balls together before they have commenced to set.

2. Applying the coloring-matter in the form of a dry powder to the surface of the balls, substantially as herein described.

3. Mixing the coloring-matter with pulverized cement and distributing such mixture in a dry state among the balls, for the purposes herein set forth.

RICHARD LAMB.

Witnesses:
THOMAS D. STETSON,
G. H. BABCOCK.